(12) United States Patent
Bard et al.

(10) Patent No.: US 9,594,429 B2
(45) Date of Patent: Mar. 14, 2017

(54) ADJUSTING THE LEVEL OF ACOUSTIC AND HAPTIC OUTPUT IN HAPTIC DEVICES

(71) Applicant: Apple Inc., Cupertino, CA (US)

(72) Inventors: Benjamin A. Bard, Los Gatos, CA (US); Curtis P. Wiederhold, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/227,149

(22) Filed: Mar. 27, 2014

(65) Prior Publication Data

US 2015/0277562 A1    Oct. 1, 2015

(51) Int. Cl.
  *G06F 3/01* (2006.01)
  *G06F 3/0354* (2013.01)
  *G06F 1/16* (2006.01)
  *G06F 3/16* (2006.01)

(52) U.S. Cl.
  CPC .............. *G06F 3/016* (2013.01); *G06F 1/169* (2013.01); *G06F 3/03547* (2013.01); *G06F 3/165* (2013.01)

(58) Field of Classification Search
  CPC ....... G06F 3/0414; G06F 3/016; G06F 1/1643
  See application file for complete search history.

(56) References Cited

U.S. PATENT DOCUMENTS

| 5,196,745 A | 3/1993 | Trumper et al. |
|---|---|---|
| 5,293,161 A | 3/1994 | MacDonald et al. |
| 5,424,756 A | 6/1995 | Ho et al. |
| 5,434,549 A | 7/1995 | Hirabayashi et al. |
| 5,436,622 A | 7/1995 | Gutman et al. |
| 5,739,759 A | 4/1998 | Nakazawa et al. |
| 6,084,319 A | 7/2000 | Kamata et al. |

(Continued)

FOREIGN PATENT DOCUMENTS

| CN | 101036105 | 9/2007 |
|---|---|---|
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Viet Pham
*Assistant Examiner* — Christopher Kohlman
(74) *Attorney, Agent, or Firm* — Brownstein Hyatt Farber Schreck, LLP

(57) ABSTRACT

A haptic device in an electronic device includes a feedback surface, one or more actuators, and a connection member connected between the feedback surface and each actuator. At least one actuator produces an attracting or repelling force that creates movement in the connection member and the feedback surface. An acoustic and a haptic output of the haptic device can be adjusted at least in part by producing an out of plane movement in the feedback surface, by changing a cross-sectional area of at least a portion of the connection member, by changing dynamically one or more biasing supports disposed below the feedback surface, and/or by changing at least one waveform characteristic of a haptic input signal received by at least one actuator.

24 Claims, 11 Drawing Sheets

(56) References Cited

U.S. PATENT DOCUMENTS

| | | |
|---|---|---|
| 6,342,880 B2 | 1/2002 | Rosenberg et al. |
| 6,373,465 B2 | 4/2002 | Jolly et al. |
| 6,438,393 B1 | 8/2002 | Suuronen |
| 6,445,093 B1 | 9/2002 | Binnard |
| 6,493,612 B1 | 12/2002 | Bisset et al. |
| 6,693,622 B1 | 2/2004 | Shahoian et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,130,664 B1 | 10/2006 | Williams |
| 7,234,379 B2 | 6/2007 | Claesson et al. |
| 7,253,350 B2 | 8/2007 | Noro et al. |
| 7,323,959 B2 | 1/2008 | Naka et al. |
| 7,339,572 B2 | 3/2008 | Schena |
| 7,355,305 B2 | 4/2008 | Nakamura et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,169,402 B2 | 5/2012 | Shahoian et al. |
| 8,174,495 B2 | 5/2012 | Takashima et al. |
| 8,217,892 B2 | 7/2012 | Meadors |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,598,750 B2 | 12/2013 | Park |
| 8,598,972 B2 | 12/2013 | Cho et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,639,485 B2 | 1/2014 | Connacher et al. |
| 8,648,829 B2 | 2/2014 | Shahoian et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,760,037 B2 | 6/2014 | Eshed et al. |
| 8,797,153 B2 | 8/2014 | Vanhelle et al. |
| 8,867,757 B1 | 10/2014 | Ooi |
| 8,872,448 B2 | 10/2014 | Boldyrev et al. |
| 8,878,401 B2 | 11/2014 | Lee |
| 8,976,139 B2 | 3/2015 | Koga et al. |
| 8,981,682 B2 | 3/2015 | Delson et al. |
| 8,987,951 B2 | 3/2015 | Park |
| 9,058,077 B2 | 6/2015 | Lazaridis et al. |
| 9,086,727 B2 | 7/2015 | Tidemand et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,286,907 B2 | 3/2016 | Yang et al. |
| 9,396,629 B1 | 7/2016 | Weber et al. |
| 2005/0036603 A1 | 2/2005 | Hughes |
| 2005/0230594 A1 | 10/2005 | Sato et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0084384 A1 | 4/2008 | Gregorio et al. |
| 2008/0111791 A1 | 5/2008 | Nikittin |
| 2008/0158149 A1 | 7/2008 | Levin |
| 2009/0085879 A1 | 4/2009 | Dai et al. |
| 2009/0115734 A1 | 5/2009 | Fredriksson et al. |
| 2009/0167542 A1 | 7/2009 | Culbert et al. |
| 2009/0167702 A1 | 7/2009 | Nurmi |
| 2009/0174672 A1 | 7/2009 | Schmidt |
| 2009/0225046 A1 | 9/2009 | Kim et al. |
| 2009/0231271 A1 | 9/2009 | Heubel et al. |
| 2009/0243404 A1 | 10/2009 | Kim et al. |
| 2009/0267892 A1 | 10/2009 | Faubert |
| 2009/0267920 A1 | 10/2009 | Faubert et al. |
| 2009/0313542 A1 | 12/2009 | Cruz-Hernandez et al. |
| 2010/0056953 A1 | 3/2010 | Couvillon |
| 2010/0060437 A1* | 3/2010 | Steckel ............ G06F 3/016 340/407.2 |
| 2010/0225600 A1 | 9/2010 | Dai et al. |
| 2010/0267424 A1 | 10/2010 | Kim et al. |
| 2010/0328229 A1 | 12/2010 | Weber et al. |
| 2011/0115754 A1* | 5/2011 | Cruz-Hernandez ...... G05G 1/08 345/184 |
| 2011/0128239 A1 | 6/2011 | Polyakov et al. |
| 2011/0132114 A1 | 6/2011 | Siotis |
| 2011/0141052 A1* | 6/2011 | Bernstein ............... G06F 3/016 345/174 |
| 2011/0163946 A1 | 7/2011 | Tartz et al. |
| 2011/0205038 A1 | 8/2011 | Drouin et al. |
| 2011/0210834 A1 | 9/2011 | Pasquero et al. |
| 2011/0910926 | 9/2011 | Pasquero et al. |
| 2012/0062491 A1 | 3/2012 | Coni et al. |
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian |
| 2012/0286943 A1 | 11/2012 | Rothkopf et al. |
| 2012/0319827 A1 | 12/2012 | Pance et al. |
| 2012/0327006 A1 | 12/2012 | Israr et al. |
| 2013/0002341 A1 | 1/2013 | Maier et al. |
| 2013/0016042 A1 | 1/2013 | Makinen et al. |
| 2013/0044049 A1 | 2/2013 | Biggs et al. |
| 2013/0127755 A1 | 5/2013 | Lynn et al. |
| 2013/0207793 A1 | 8/2013 | Weaber et al. |
| 2013/0229088 A1* | 9/2013 | Jung ..................... G06F 3/016 310/317 |
| 2013/0253818 A1 | 9/2013 | Sanders et al. |
| 2013/0278401 A1 | 10/2013 | Flaherty et al. |
| 2014/0002386 A1 | 1/2014 | Rosenberg et al. |
| 2014/0028573 A1 | 1/2014 | Olien et al. |

(56) References Cited

U.S. PATENT DOCUMENTS

| | | |
|---|---|---|
| 2014/0125470 A1 | 5/2014 | Rosenberg |
| 2014/0218183 A1 | 8/2014 | Van Schyndel et al. |
| 2014/0218853 A1 | 8/2014 | Pance et al. |
| 2014/0225831 A1 | 8/2014 | Shinozaki et al. |
| 2014/0225832 A1 | 8/2014 | Wright et al. |
| 2014/0274398 A1* | 9/2014 | Grant .................. G06F 3/0338 463/37 |
| 2014/0282270 A1 | 9/2014 | Slonneger |
| 2014/0347323 A1 | 11/2014 | Colgate et al. |
| 2015/0097800 A1 | 4/2015 | Grant et al. |
| 2015/0116205 A1 | 4/2015 | Westerman et al. |
| 2015/0123500 A1 | 5/2015 | Jung |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0205357 A1 | 7/2015 | Virtanen et al. |
| 2015/0234493 A1 | 8/2015 | Parivar et al. |
| 2015/0338919 A1 | 11/2015 | Weber et al. |
| 2015/0338921 A1 | 11/2015 | Burnbaum et al. |
| 2015/0349619 A1 | 12/2015 | Degner et al. |
| 2016/0011664 A1 | 1/2016 | Silvanto et al. |

FOREIGN PATENT DOCUMENTS

| | | |
|---|---|---|
| CN | 101663104 | 3/2010 |
| CN | 101872257 | 10/2010 |
| EP | 1686776 | 8/2006 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO02/073587 | 9/2002 |
| WO | WO2006/091494 | 8/2006 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Stanford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

ADJUSTING THE LEVEL OF ACOUSTIC AND HAPTIC OUTPUT IN HAPTIC DEVICES

TECHNICAL FIELD

The present invention relates generally to electronic devices, and more particularly to haptic feedback in electronic devices.

BACKGROUND

Electronic devices may employ haptics to provide the user with a tactile output, for example in response to a particular input by the user, a system state, or an application instruction. As a specific example, some electronic devices such as a laptop computer include a track pad or button that may move or vibrate to provide a haptic output to the user. In some situations, the track pad or button can also produce a sound or an acoustic output that is based on the movement of the track pad or button. The mix of the haptic and acoustic output may be unacceptable to user, and typically the haptic and acoustic output cannot be varied.

SUMMARY

Embodiments described herein permit the haptic and acoustic output of a haptic device to be changed. In one aspect, an electronic device can include a feedback surface and one or more actuators operably connected to the feedback surface. In some embodiments, a connection member may be operably connected between the feedback surface and each actuator. At least one actuator produces an attracting and/or repelling force that moves the connection member and the feedback surface. The movement can produce a haptic and acoustic output in the haptic device. An output adjustment mechanism may adjust the haptic and acoustic output of the haptic device. In one example, the output adjustment mechanism can be the positioning of at least one actuator so that the attracting and/or repelling force produced by the at least one actuator produces an out of plane movement in the feedback surface. The attracting and/or repelling force can also produce an in-plane movement. In another example, the output adjustment mechanism may be a material that is attached to at least a portion of an exterior surface of the connection member to change a cross-sectional area of the connection member. In yet another example, the output adjustment mechanism can be a connection member that has a different cross-sectional area in at least a portion of the connection member. In another example, the output adjustment mechanism may be one or more biasing supports that are adapted to change dynamically to adjust a haptic and acoustic output of the haptic device. For example, the one or more biasing supports can be made of a piezoelectric material that changes shape based on an input signal. These examples can be used in a haptic device individually or in various combinations.

In another aspect, one or more different haptic input signals can be received by at least one actuator to adjust the attracting and/or repelling force produced by the at least one actuator to change the haptic and acoustic output of the haptic device.

In another aspect, method for adjusting a haptic and acoustic output of a haptic device can include applying an attracting and/or repelling force to a feedback surface to produce a particular out of plane movement in the feedback surface. In some embodiments, a different haptic input signal can be received by at least one actuator to adjust the attracting and/or repelling force to change the haptic and acoustic output of the haptic device.

In another aspect, a method for adjusting a haptic and acoustic output of a haptic device can include producing by an actuator an attracting and/or repelling force to move a connection member and a feedback surface. An amount of the attracting and/or repelling force produced by the actuator is based on the haptic and acoustic output produced at least in part by a material attached to at least the portion of the exterior surface of the connection member, and/or by a shape of a cross-sectional area of at least a portion of the connection member.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures

DETAILED DESCRIPTION

A haptic device in an electronic device includes a feedback surface and one or more actuators operably connected to the feedback surface. At least one actuator produces an attracting and/or a repelling force that creates movement in the feedback surface. An acoustic and haptic output of the haptic device can be adjusted at least in part by producing an out of plane movement in the feedback surface, by changing a cross-sectional area of at least a portion of the connection member, by changing dynamically one or more biasing supports disposed below the feedback surface, and/or by changing at least one waveform characteristic of a haptic input signal received by at least one actuator.

Figure 1:
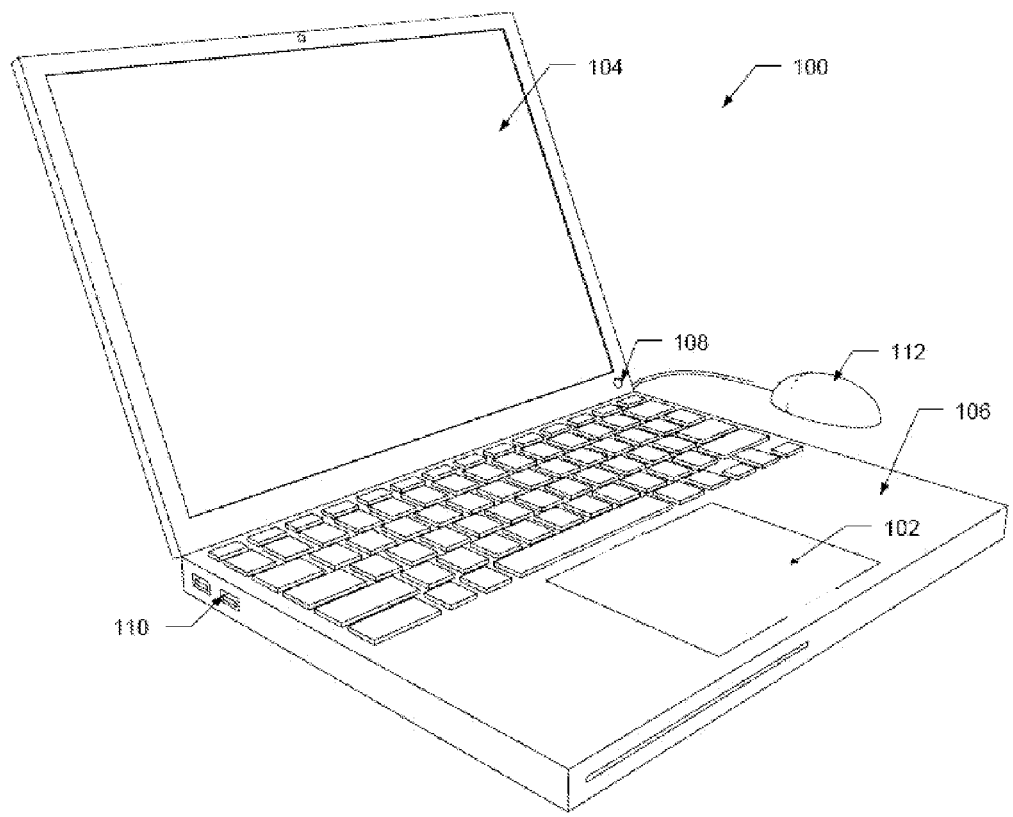
FIG. 1 is a perspective view of one example of an electronic device that incorporates a haptic device.
Figure 2:
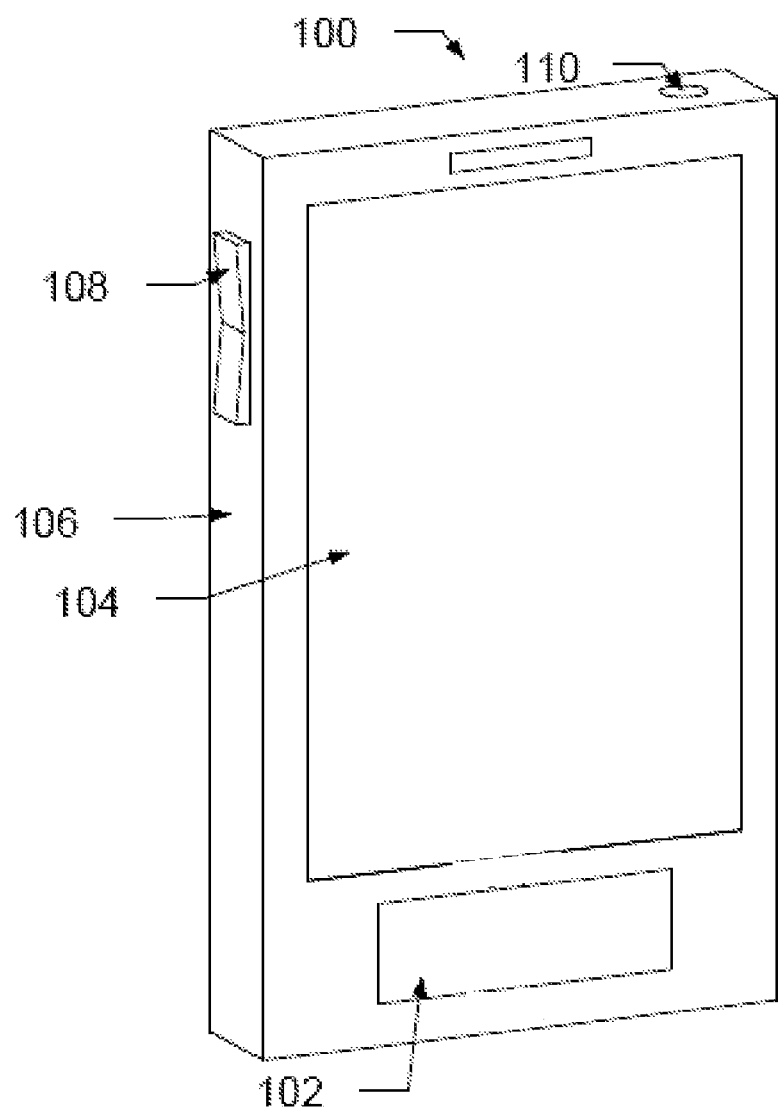
FIG. 2 is a perspective view of another example of an electronic device that incorporates a haptic device.

The methods and devices described herein may be used with substantially any type of apparatus or device where haptic feedback may be desired. FIGS. 1 and 2 are perspective views of exemplary electronic devices that can incorporate a haptic device. As shown in FIG. 1, the electronic device 100 may be a laptop computer. Alternatively, as depicted in FIG. 2, the electronic device 100 can be a smart telephone or mobile electronic device. It should be noted that the electronic devices illustrated in FIGS. 1 and 2 are illustrative only and substantially any other type of electronic device, such as but not limited to, a computer, a mobile phone, a digital music player, a digital camera, a calculator, a personal digital assistant, a tablet computing device, and so on may include one or more haptic devices.

With reference to FIGS. 1 and 2, the electronic device 100 may include a haptic device 102, a display 104, an input/output member 108, and an input/output port 110. The display 104 may provide an image or video output for the electronic device 100. The display 104 can be substantially any size and may be positioned substantially anywhere on the electronic device 104. In some embodiments, the display 104 can be a liquid display screen, a plasma screen, a light emitting diode screen, and so on. The display 104 may also function as an input device in addition to displaying output from the electronic device 100. For example, the display 104 can include capacitive touch sensors, infrared touch sensors, or the like that may capture a user's input to the display 104. In these embodiments, a user may press on the display 104 in order to provide input to the electronic device 100. In other embodiments, the display 104 may be separate from or otherwise external to the electronic device but in communication therewith to provide a visual output for the electronic device.

The input/output member 108 allows a user to interact with the electronic device 100. The input/output member 108 can be a switch, a capacitive sensor, a button, speakers, or another input/output mechanism. For example, the input/output member 108 may be a button or switch to power on/off the device 100, alter the volume of a speaker, return to a home screen, and the like. The electronic device 100 can include one or more input/output members 108, and each input/output member 108 may have one or more input/output functions. Furthermore, as briefly mentioned above, in some embodiments, the input/output member 108 can be incorporated into the display 104, e.g., a capacitive touch screen as the display 104.

The enclosure 106 may form a portion of an exterior of the electronic device 100 and may at least partially surround all or select components, such as the display 104, the haptic device 102, the input/output member 108, the input/output port 110, a processor, memory, and so on, of the electronic device 100. The enclosure 106 may be removable from the device 100, or may be substantially secured around the select components.

The input/output port 110 may be formed within or defined by the enclosure 106 and may electrically connect an external device to one or more internal components of the electronic device 100. Example external devices include, but are not limited to, headphones, speakers, communication networks such as the Internet, and removable memory storage. The input/output port 110 can be configured to receive an electrical connector for the electronic device 100. For example, the input/output port 110 may be configured to receive a power cord, a data cable (e.g., universal serial bus, fiber optic, tip ring sleeve connector, and the like), or a combination data and power cable. The electronic device 100 can include more than one input/output port 110 and each input/output port 110 may be positioned substantially anywhere on the electronic device 100.

With respect to FIG. 1, the electronic device 100, via an input/output port 110, may also be in communication with one or more external devices 112. In some embodiments, the haptic device 102 may be incorporated into an external device 112, such as a mouse, a track pad, a joystick, or other input device.

Figure 3:
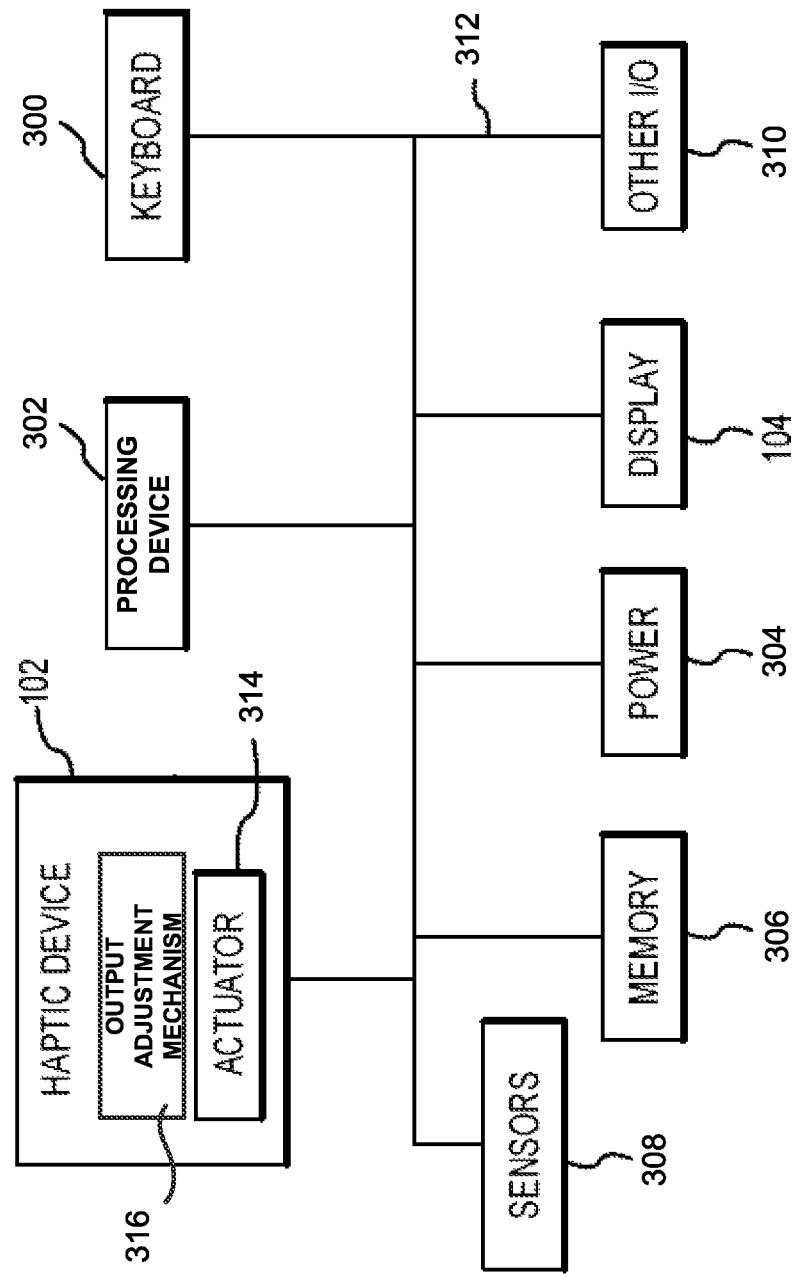
FIG. 3 is an example block diagram of the electronic device of FIG. 1.

FIG. 3 is an example block diagram of the electronic device of FIG. 1. The electronic device 100 can include the haptic device 102, the display 104, a keyboard 300, a processing device 302, a power source 304, a memory or storage device 306, a sensor 308, and an input/output device and/or input/output (I/O) port 310. The processing device 302 can control some or all of the operations of the electronic device 100. The processing device 302 can communicate, either directly or indirectly, with substantially all of the components of the electronic device 100. For example, a system bus or signal line 312 or other communication mechanism can provide communication between the processing device 302, the haptic device 102, the power source 304, the memory 306, the sensor 308, and/or the I/O device and/or I/O port 310. The processing device 302 may communicate with the haptic device 102 to control one or more actuators 314 and/or an output adjustment mechanism 316 of the haptic device 102. As will be described in more detail later, the output adjustment mechanism can position at least one actuator so that the attracting and/or repelling force produced by the at least one actuator produces an out of plane movement in the feedback surface. Additionally or alternatively, the output adjustment mechanism may include a cross-sectional area of at least one connection member. Additionally or alternatively, the output adjustment mechanism can be one or more biasing supports that are adapted to change dynamically to adjust a haptic and acoustic output of the haptic device. Additionally or alternatively, the output adjustment mechanism can produce a different haptic input signal that is received by the at least one actuator to adjust a haptic and acoustic output of the haptic device.

The processing device 302 can be implemented as any electronic device capable of processing, receiving, or transmitting data or instructions. For example, the processing device 302 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

It should be noted that the components of the electronic device can be controlled by multiple processing devices. For example, select components of the electronic device 100 may be controlled by a first processing device and other components of the electronic device 100 may be controlled by a second processing device where the first and second processing devices may or may not be in communication with each other.

The power source 304 can be implemented with any device capable of providing energy to the electronic device 100. For example, the power source 304 may be one or more batteries or rechargeable batteries, or a connection cable that connects the remote control device to another power source such as a wall outlet.

The memory 306 can store electronic data that can be used by the electronic device 100. For example, a memory can store electrical data or content such as, for example, audio and video files, documents and applications, device settings and user preferences, timing signals, haptic input signals, data structures or databases, and so on. In some embodiments, the memory 306 may store user settings with respect to the haptic device 102. The memory 202 can be configured as any type of memory. By way of example only, the memory can be implemented as random access memory, read-only memory, Flash memory, removable memory, or other types of storage elements, or combinations of such devices.

The electronic device 100 may also include one or more sensors 308 positioned substantially anywhere on the electronic device 100. The sensor or sensors 308 can be configured to sense substantially any type of characteristic, such as but not limited to, images, pressure, light, touch, heat, movement, relative motion, fingerprint data, and so on. For example, the sensor(s) 308 may be an image sensor, a heat sensor, a force sensor, a position sensor, a light or optical sensor, an accelerometer, a pressure transducer, a gyroscope, a magnet, a health monitoring sensor, a biometric sensor, and so on. Additionally, the one or more sensors 308 can utilize any suitable sensing technology, including, but not limited to, capacitive, ultrasonic, resistive, optical, ultrasound, piezoelectric, and thermal sensing technology.

The I/O device and/or I/O port 310 can transmit and/or receive data to and from a user or another electronic device. The I/O device(s) can include a display, a touch sensing input surface such as a trackpad, one or more buttons, one or more microphones or speakers, one or more ports such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet.

It should be noted that FIGS. 1-3 are exemplary only. In other examples, the electronic device may include fewer or more components than those shown in FIGS. 1-3. Additionally, the illustrated electronic devices are only exemplary devices that can include a haptic device 102. In other embodiments, a haptic device may be incorporated into substantially any type of device that provides haptic feedback to a user. Additionally or alternatively, a haptic device can be included in any type of component within, or connected to an electronic device. For example, one or more haptic devices can be included in an enclosure or button of an electronic device, or in a component operatively connected to an electronic device (e.g., mouse or keyboard).

Figure 4:
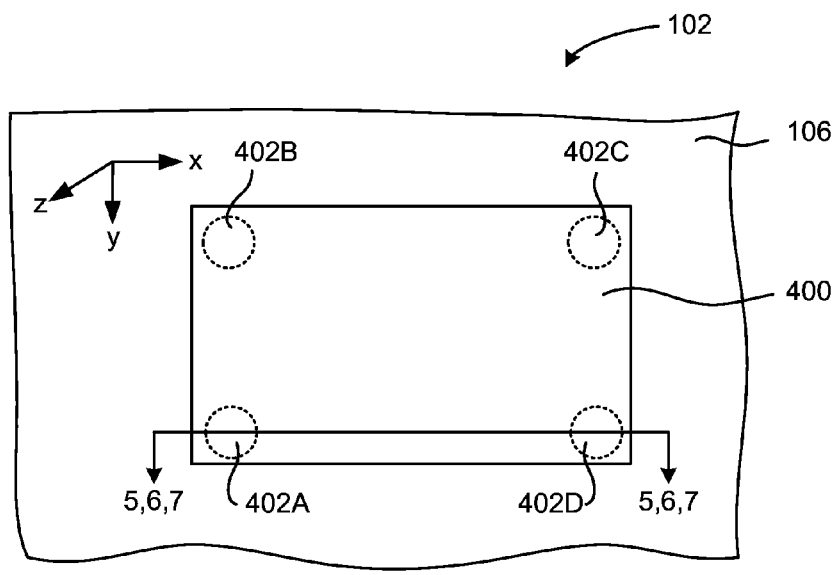
FIG. 4 is an enlarged top plan view of the haptic device of FIG. 1.
Figure 5:
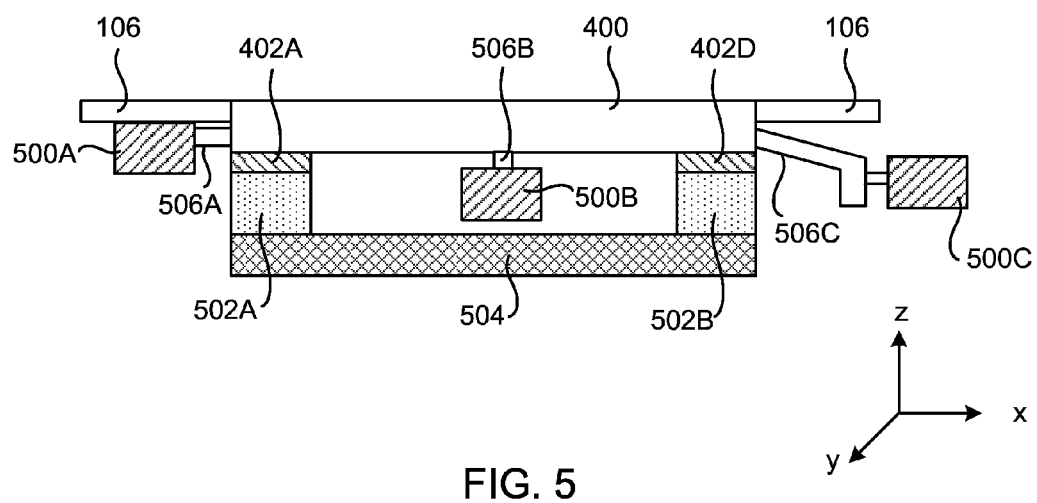
FIG. 5 is a cross-sectional view of a first example of the haptic device 102 taken along line 5-5 in FIG. 4.

Referring now to FIGS. 4 and 5, there is shown an enlarged plan view and a cross-sectional view of a first example of the haptic device 102, respectively. The haptic device 102 selectively provides output or feedback to a user by moving, vibrating, or otherwise alternating a feedback surface 400. In the illustrated embodiment, the feedback surface 400 is substantially co-planar with an exterior surface of the enclosure 106 of the electronic device. Although shown in a rectangular shape, the feedback surface 400 may have any suitable shape and dimensions.

Additionally, the haptic device 102 can include one more force sensors 402A, 402B, 402C, 402D. In some embodiments, the haptic device can include other types of sensors, such as a position sensor (not shown) that may be disposed below the feedback surface 400 and an acceleration sensor (not shown) configured to detect an acceleration of a user input. The force sensor(s) can be any suitable type of sensor capable of detecting an exerted force. For example, in some embodiments each force sensor may be a strain gauge.

As shown in FIG. 5, the haptic device 102 may also include one or more biasing supports 502A, 502B to secure and support the haptic device 102 to the electronic device 100 and/or to support the feedback surface 400 above a substrate 504. In some embodiments, a haptic device may include four biasing supports that each may be operably connected to the feedback surface 400 below or at a location substantially adjacent to the location of the force sensors 402A, 402B, 402C, 402D. The biasing supports 502A, 502B provide a biasing force to the feedback surface 400 to return the feedback surface 400 to a normal or first position. The biasing supports may be substantially any member capable of providing a biasing or return force to the feedback surface 400. In some embodiments, the biasing supports may be a relatively flexible and resilient member, such as a gel. In this example, the gel may be a silicon based gel that may be positioned around the sides of the feedback surface 400. In other embodiments, the biasing supports can be one or more springs spanning between the substrate 504 and the feedback surface 400. And in yet other embodiments, the haptic device 102 may use a magnetic force from one or more magnets to return the feedback surface 400 to the first position.

The haptic device 102 may include one or more actuators 500A, 500B, 500C operably connected to the feedback surface 400 by one or more connection members 506A, 506B, 506C. At least one actuator 500A, 500B, 500C can receive one or more haptic input signals from a processing device (e.g., processing device 302 in FIG. 3) or other controlling element, and those signals may be converted into mechanical movement by the actuator. Any suitable type of actuator can be included in the haptic device 102. For example, an actuator may be a solenoid actuator including a wire wound around a moveable iron core, and as a current passes through the wire coil, the iron core may move correspondingly. Specifically, the electric current through the wire may create a magnetic field. The magnetic field may then apply a force to the core or plunger, to either attract or repel the core. In these embodiments, the actuator may also include a spring or biasing member which may return the core to its original position after the magnetic field is removed. In other embodiments, an actuator may be an electromagnet, or a series of magnets that are selectively energized to attract or repel the feedback surface 400. As a specific example, the actuator may be a series of bar electromagnets with alternating poles that may be used to mechanically move the feedback surface 400.

Each actuator may selectively move the feedback surface 400 in a horizontal or linear direction, e.g., along the X axis and/or the Y axis illustrated in FIG. 4. In other words, the feedback surface 400 may translate horizontally but may not move vertically with respect to the enclosure 106. In other embodiments, the actuator or actuators may move the feedback surface 400 in a vertical direction (along a Z axis) or in a combination of vertical and linear directions. In some embodiments, a haptic device may produce an acoustic response when providing a haptic response to a user. With respect to the haptic device 102, the sound can be created by vibrations in the feedback surface (e.g., top surface) of the haptic device. The motion in the z-direction of the feedback surface can move the air and produce sound. Additionally or alternatively, movement in a connection member operably connected to the feedback surface may produce an acoustic output based on the movement.

Embodiments described herein adjust or change the levels of an acoustic and haptic output in a haptic device. As will be described in more detail later, the acoustic and haptic output can be adjusted in one embodiment by varying a haptic input signal that is received by one or more actuators. Another embodiment may alter the position of an actuator and/or a connection member with respect to a feedback surface of the haptic device. And in yet another embodiment, a cross-sectional area of a connecting member operatively connected to a feedback surface of the haptic device can vary or be different to adjust the acoustic and haptic output of the haptic device. These embodiments can be utilized individually or in various combinations.

For example, as shown in FIG. 5, the actuators move the feedback surface through a respective connection member 506A, 506B, 506C. The first actuator 500A is positioned to produce a horizontal attracting and/or repelling force on the feedback surface 400, while the second actuator 500B is situated to generate a vertical attracting and/or repelling force on the feedback surface 400. The third actuator 500C produces a horizontal and a vertical attracting and/or repelling force on the feedback surface through the connection member 506C. The repelling and/or attracting force produced by the actuator 500C is applied at an angle to the feedback surface 400, so movement of the feedback surface can occur in both a linear (x and/or y) direction and in a vertical (z) direction. In some embodiments, the actuator and/or the connection member can be positioned with respect to the feedback surface so that the attracting and/or repelling force is applied to the feedback surface 400 at an angle. Additionally or alternatively, the shape of the connection member can be configured to apply the attracting and/or repelling force to the feedback surface at an angle (e.g., see connection member 506C).

In other words, the repelling and/or attracting force produced by an actuator can produce out-of-plane movement (z direction) in the feedback surface 400, and may also produce in-plane movement (x direction and/or y direction) in the feedback surface. The in-plane movement produces a haptic response, and in some embodiments, a haptic and an acoustic response. The out-of-plane movement generates a haptic and an acoustic response. The acoustic and haptic responses may be adjusted based on the angle at which the attracting and/or repelling force is applied to the feedback surface. Some angles may produce a greater haptic output and a smaller acoustic output in the feedback surface, while other angles can produce a greater acoustic output and a smaller haptic output in the feedback surface.

In some embodiments, a different sound may be produced when a single actuator 500A, 500B, or 500C moves the feedback surface compared to when two or more actuators move the feedback surface. Additionally, a different sound may be produced when the actuator 500A moves the feedback surface compared to when the actuator 500B or 500C moves the feedback surface. Thus, the acoustic and haptic output of the haptic device can be adjusted based on the positioning and selective activation of one or more actuators.

Figure 6:
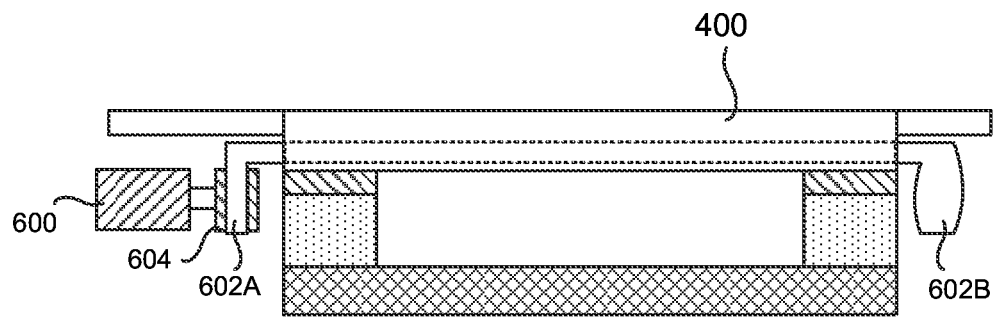
FIG. 6 is a cross-sectional view of a second example of the haptic device 102 taken along line 5-5 in FIG. 4.

FIG. 6 is a cross-sectional view of a second example of the haptic device 102 taken along line 5-5 in FIG. 4. As discussed earlier, movement in a connection member operably connected to the feedback surface may produce an acoustic or haptic output. As will now be described in conjunction with FIG. 6, the haptic and acoustic output of the haptic device may be adjusted based on the cross-sectional area of one or more connection members.

As shown in FIG. 6, an actuator 600 is operatively connected to the feedback surface 400 through a connection member 602A. A material is attached to, or may surround at least a portion of the exterior surface of the connection member to adjust the haptic and acoustic output produced in the feedback surface. In the illustrated embodiment, the material is positioned at a location that is substantially adjacent to a location of the actuator 600, but other embodiments can position the material at a different location or at one or more locations. In one embodiment, the material is a lightweight but rigid material, such as a synthetic fiber. The material 604 modifies the cross-sectional areas of the connection member 602A, which may produce a different acoustic and haptic output when the actuator 600 moves the feedback surface 400.

In some embodiments, the connection member 602A may extend to another side of the feedback surface 400. In the illustrated embodiment, the other side of the feedback surface is the side that opposes the side adjacent to the actuator 600. When the actuator 600 moves the connection member 602A to move the feedback surface 400, the connection member 602B may also move. The connection member 602B is fabricated so that a cross-sectional area of at least a portion of the connection member 602B varies or is different from another portion of the connection member. The different cross-sectional area of the connection member 602B may result in a different acoustic and haptic output when the actuator 600 moves the feedback surface 400.

Additionally or alternatively, a separate and distinct connection member operably attached to the feedback surface can be fabricated to have a different or varying cross-sectional area in at least a portion of the connection member (e.g., see 602B) and/or can have a material attached to at least a portion of an exterior surface of the connection member (e.g., see 602A). The connection member may or may not be operatively connected to an actuator. The cross-sectional area of the connection member may result in a different acoustic and haptic output when the connection member is moved. Some cross-sectional areas may produce a greater haptic output and a smaller acoustic output in the feedback surface, while other cross-sectional areas can produce a greater acoustic output and a smaller haptic output in the feedback surface.

Figure 7:
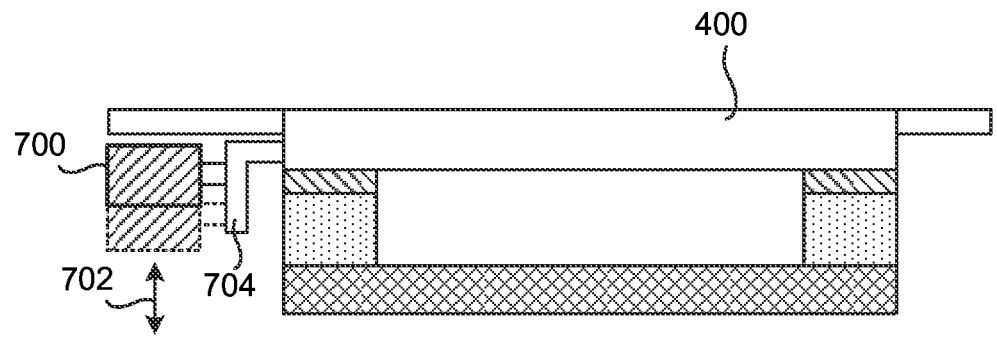
FIG. 7 is a cross-sectional view of a third example of the haptic device 102 taken along line 5-5 in FIG. 4.

Changing the position of the actuator is another way to adjust the acoustic and haptic output of a haptic device. As shown in FIG. 7, the actuator 700 can be raised or lowered to different positions (represented by arrow 702), thereby changing the position where the attracting and/or repelling force is applied to the feedback surface 400 via the connection member 704.

Other embodiments can adjust the position of one or more connection members. For example, a position of a connection member can be adjusted in the vertical or z direction (e.g., raised or lowered), the horizontal direction (x and/or y direction) or rotated to produce a different haptic and acoustic output.

In some embodiments, the actuator or actuators can be configured to respond to one or more haptic input signals that may vary the mechanical output of at least one actuator in the haptic device. For example, if an actuator is a solenoid actuator, the various waveforms of the haptic input signals may vary the current through the wire, and thus may vary the magnetic field created. By changing the magnetic field, different types of mechanical movements may be created. Example different waveforms for the actuator will be discussed in more detail with respect to FIGS. 11 and 15. The haptic input signal or signals can be stored in a memory, such as the memory 306 in FIG. 3.

The haptic input signal can be, for example, a sinusoidal wave, a half sinusoidal wave, a half elliptical wave, a saw-tooth wave, a pulse, a ramp down or ramp up wave, a square wave, and various combinations of such waveforms. As the actuator receives the haptic input signal, the mechanical movement output by the actuator may vary, such that one type of waveform may have a different acoustic and haptic output compared to another waveform. In other words, the displacement direction or directions and/or speed of the feedback surface may be varied by changing the shape, frequency, amplitude, phase, and/or duration of the haptic input signal. Thus, by changing the haptic input signal the haptic and acoustic output experienced by a user may be changed.

Figure 8:
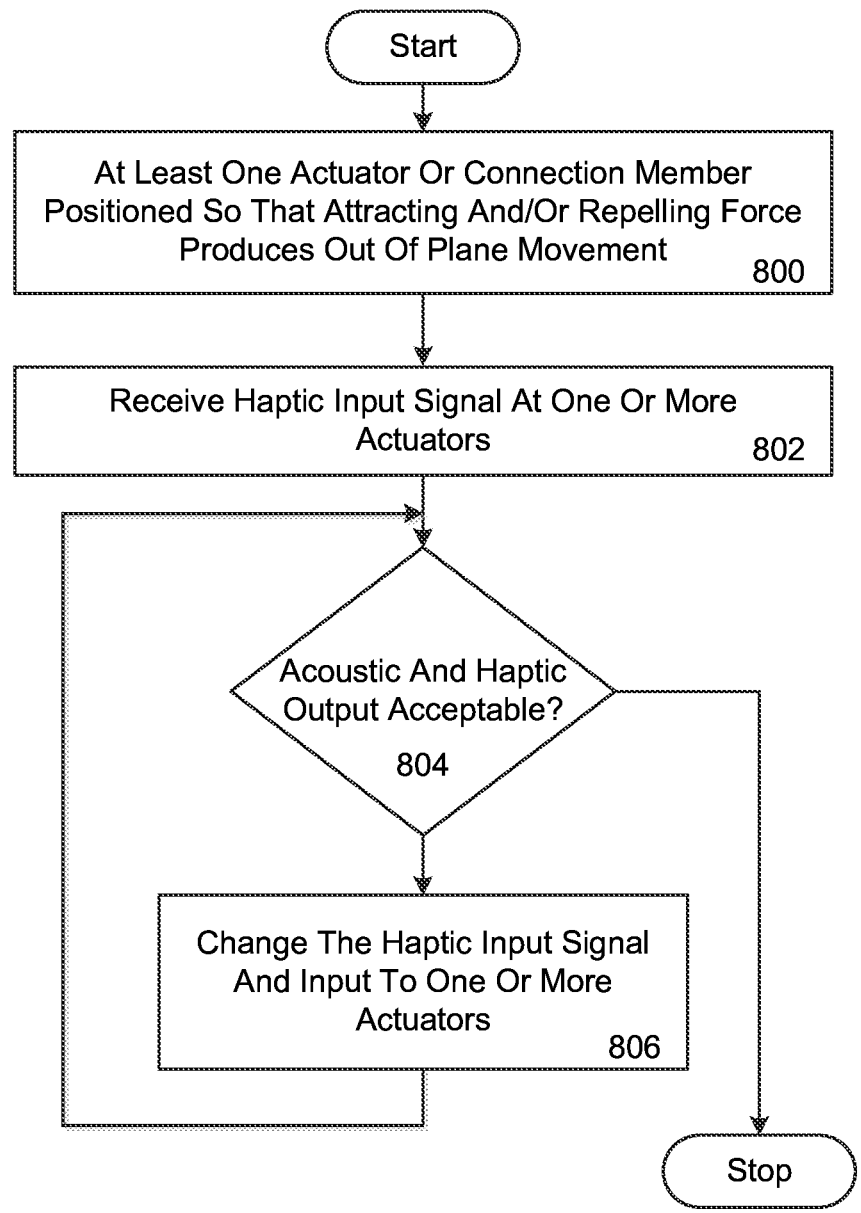
FIGS. 8-10 are flowcharts of methods for adjusting an acoustic and a haptic output of a haptic device.
Figure 9:
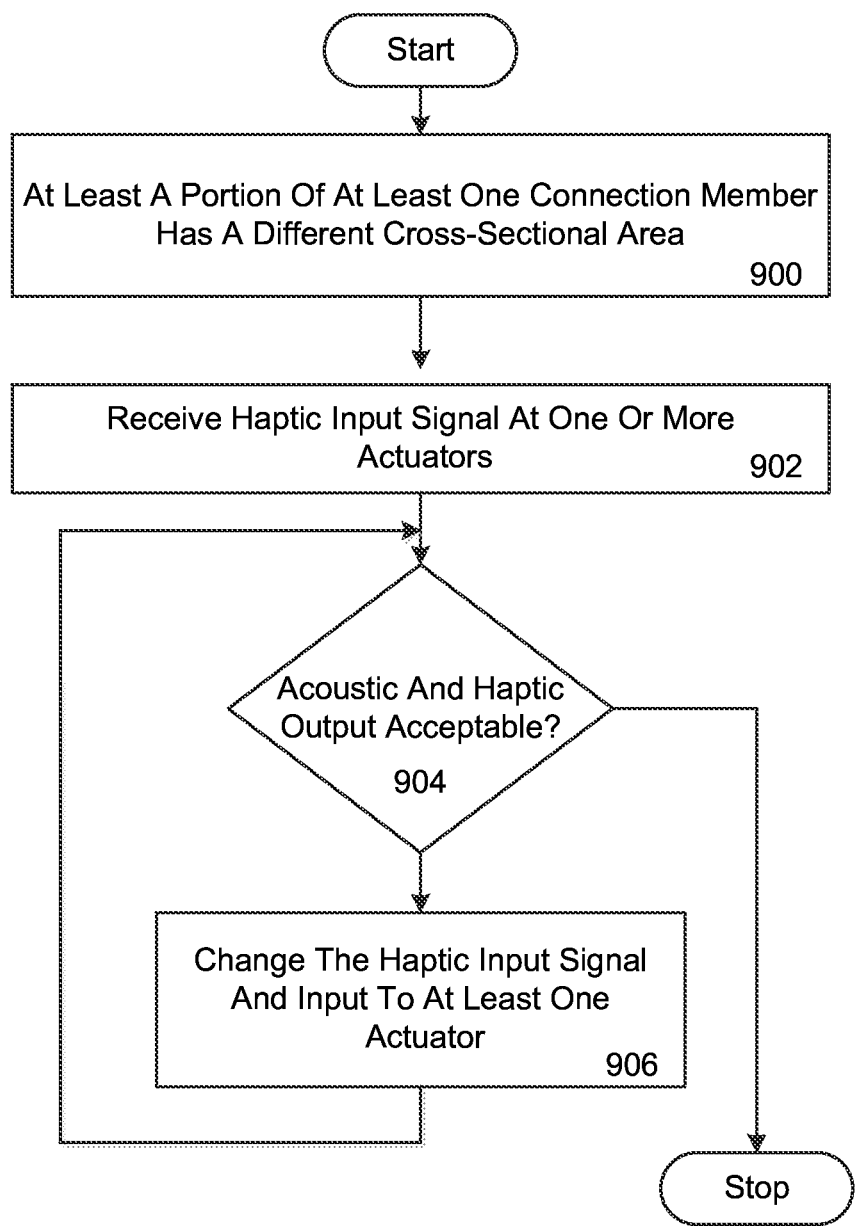
Figure 10:
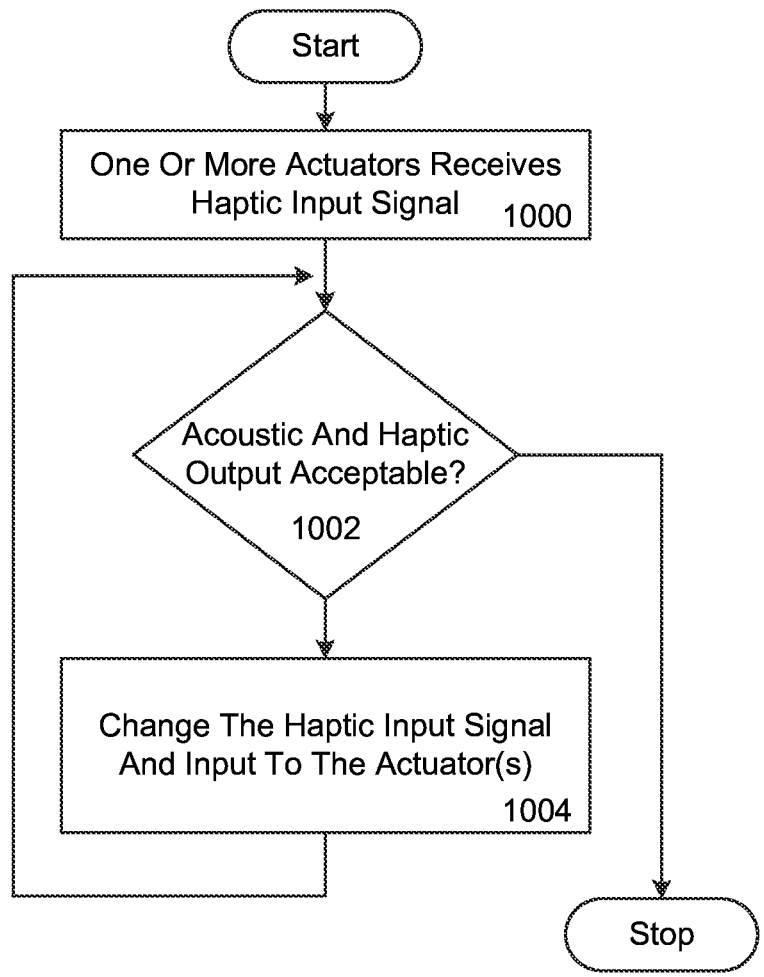

FIGS. 8-10 are flowcharts of methods for adjusting an acoustic and a haptic output of a haptic device. In FIG. 8, one or more actuators and/or one or more connection members can be positioned with respect to the feedback surface 400 so that an attracting and/or repelling force produced by at least one actuator produces out-of-plane movement in the feedback surface. As described previously, in-plane movement can also be produced in the feedback surface. A haptic input signal can then be received by at least one actuator and a determination may be made as to whether or not the acoustic and haptic output is acceptable (blocks 802 and 804). If so, the method ends. If the acoustic and haptic output is not acceptable, the process passes to block 806 where the haptic input signal is changed and then received by one or more actuators. The method then returns to block 804.

In FIG. 9, at least a portion of at least one connection member varies or is different from another portion of the connection member and/or from another connection member in the haptic device (block 900). A haptic input signal can then be received by at least one actuator and a determination may be made as to whether or not the acoustic and haptic output is acceptable (blocks 902 and 904). If so, the method ends. If the acoustic and haptic output is not acceptable, the process passes to block 906 where the haptic input signal is changed and then received by one or more actuators. The method then returns to block 904.

With respect to FIG. 10, a haptic input signal is received by one or more actuators at block 1000. The haptic input signal can be, for example, a sinusoidal wave, a half sinusoidal wave, a half elliptical wave, a saw-tooth wave, a pulse, a ramp down or ramp up wave, a square wave, and various combinations of such waveforms. As each actuator receives the haptic input signal, the mechanical movement output by the actuator may vary, such that one type of waveform may have a different acoustic and haptic output compared to another waveform. In other words, the displacement direction or directions and/or speed of the feedback surface may be varied by changing the shape, frequency, amplitude, phase, and/or duration of the haptic input signal. Thus, by changing the input waveform the haptic and acoustic output experienced by a user may be changed.

Next, as shown in block 1002, a determination is made as to whether or not the acoustic and haptic output is acceptable. If so, the method ends. If the acoustic and haptic output is not acceptable, the process passes to block 1004 where the haptic input signal is adjusted and then input into the actuator(s). Next, the method returns to block 1002 and repeats until the haptic and acoustic output is acceptable.

As described earlier, a haptic input signal can be changed by adjusting one or more waveform characteristics of a haptic input signal. The different waveform can have a different shape as the previous waveform, or one or more characteristics of the waveform can be changed. By way of example only, the magnitude, frequency, phase, and/or duration of a haptic input signal may vary. A different haptic input signal can be selected by a user at block 806, block 906, and block 1004, or a processing device may select a different haptic input signal. As one example, the user can select a different waveform through a menu or control panel.

The illustrative methods shown in FIGS. 8-10 may be performed by a manufacturer at the time the haptic device is fabricated. Additionally or alternatively, the method can be performed by a user when a user wishes to change the haptic and acoustic output of a haptic device. In some embodiments, a user can customize the haptic and acoustic output for select applications or functions.

Other embodiments can perform the methods shown in FIGS. 8-10 differently. Additionally, each method can be used for a single actuator or for multiple actuators in a haptic device. In embodiments that have multiple actuators, a different haptic input signal can be input into each actuator, or all of the actuators can receive the same haptic input signal.

Figure 11:
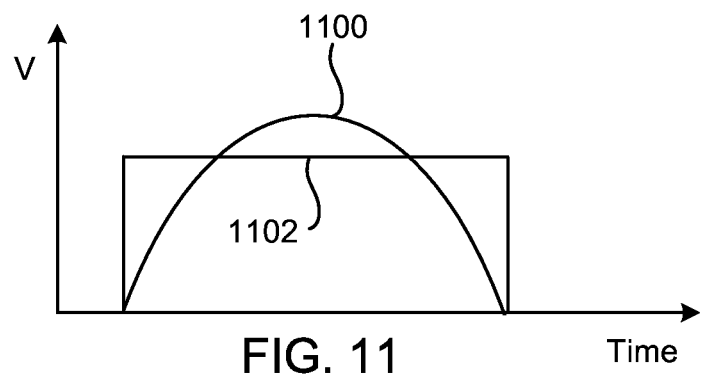
FIG. 11 illustrates a first graph of two examples of a haptic input signal.
Figure 12:
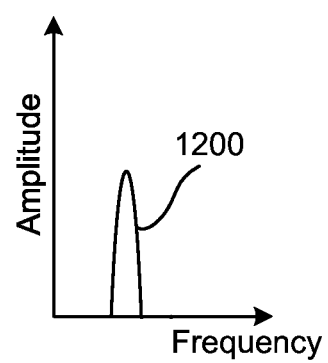
FIG. 12 depicts an example fundamental frequency associated with the haptic input signal 1100 shown in FIG. 11.

In some instances, movement of the feedback surface in response to a particular haptic input signal may be a damped response, in that the feedback surface may be actuated by an actuator and then may oscillate at reduced levels towards the normal position. In other words, the feedback surface may have an initial displacement and then a series of smaller displacements as the feedback surface is acted upon by the biasing members (e.g., biasing members 502A, 502B). FIG. 11 depicts a graph of two examples of haptic input signals. Input signal 1100 is a half sine wave and input signal 1102 a square wave. In some embodiments, a half sine wave may produce a frequency pulse as an output, as shown in FIG. 12. The half sine wave can produce a single movement in a feedback surface. In a haptic device, the half sine wave can result in an increased haptic output compared to the acoustic output (or vice versa depending on the feedback surface and/or the haptic device).

Figure 13:
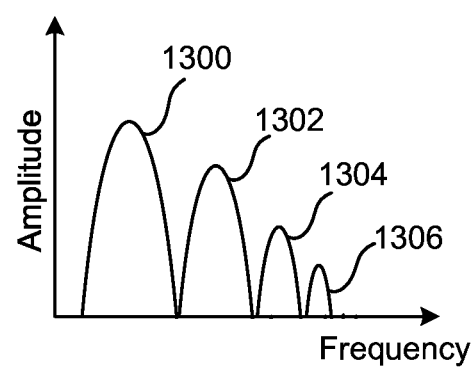
FIG. 13 illustrates an example fundamental and harmonics frequencies associated with the haptic input signal 1102 shown in FIG. 11.

Alternatively, a square wave can produce frequency spectrum pulses 1300, 1302, 1304, 1306 (see FIG. 13). In a haptic device, the sharp corners of the square wave can produce frequency pulses that can result in an increased acoustic output compared to the haptic output. In a feedback surface, the frequency pulse 1300 can cause the feedback surface to have an initial displacement or movement impulse, and the other frequency pulses 1302, 1304, 1306 may cause a series of smaller displacements as the feedback surface returns to the normal or first position.

Figure 14:
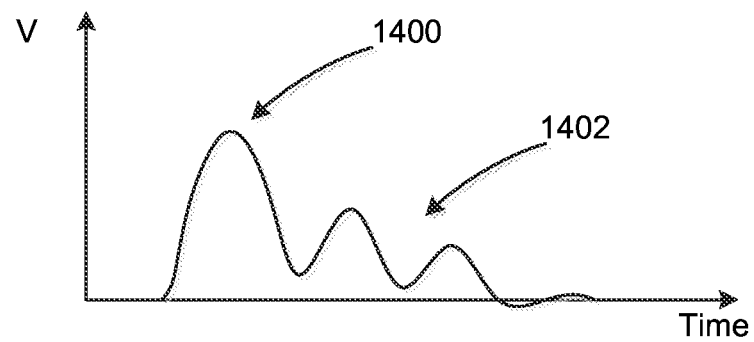
FIG. 14 depicts an example graph of an output response of the feedback surface that is produced by the haptic input signal 1102 shown in FIG. 11.

FIG. 14 depicts an example graph of an output response of the feedback surface that is produced by the haptic input signal 1102 shown in FIG. 11. After the initial pulse or output 1400, the displacement of the feedback surface has additional oscillations or ring down waves 1402. Thus, although an actuator may provide only a single movement impulse for force, the feedback surface may oscillate slightly after the original movement. The initial and ring down waves can produce a different acoustic and haptic output in the haptic device.

Figure 15:
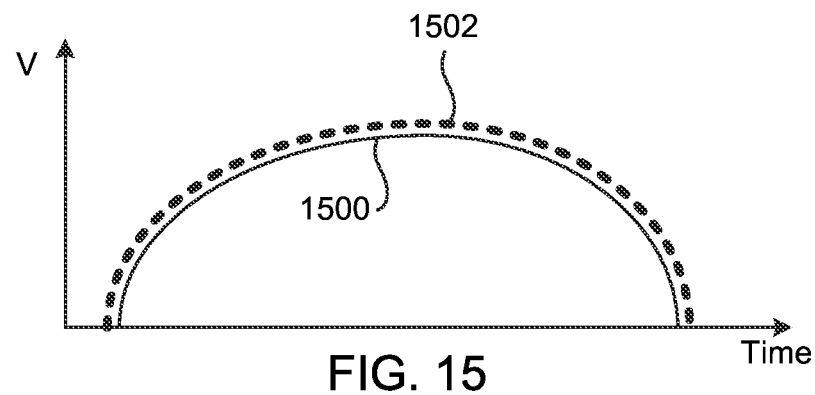
FIG. 15 illustrates a second graph of an example of a haptic input signal.

Referring now to FIG. 15, there is shown a second graph of an example of a haptic input signal. The input signal 1500 is shaped similarly to a half sine wave 1500 in the illustrated, but imposed on top of or over the half sine wave is another signal 1502. The half sine wave 1500 combined with the other signal 1502 can produce a different acoustic and haptic output in a haptic device. The other signal 1502 can be implemented with any suitable signal or waveform. For example, in one embodiment the other signal can be a higher frequency half sine wave.

Figure 16:
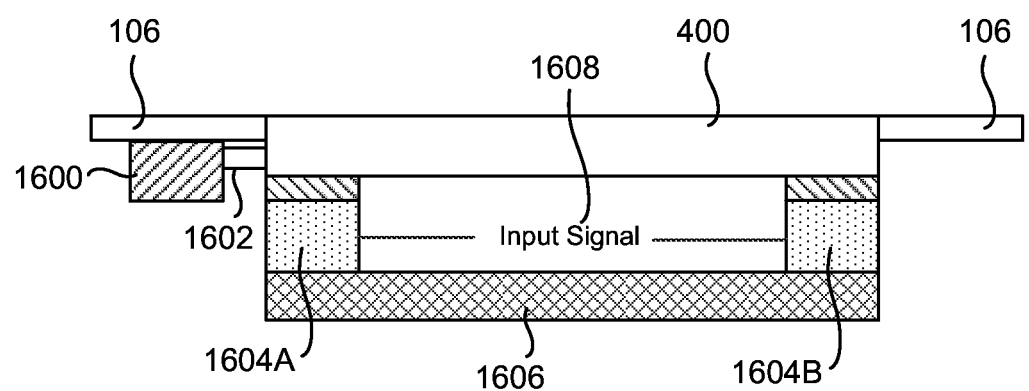
FIG. 16 depicts a cross-sectional view of a fourth example of the haptic device 102 taken along line 5-5 in FIG. 4.

FIG. 16 illustrates a cross-sectional view of a fourth example of the haptic device 102 taken along line 5-5 in FIG. 4. An actuator 1600 is operably connected to the feedback surface 400 through connection member 1602. One or more biasing supports 1604A, 1604B are disposed below the feedback surface 400 to secure and support the haptic device 102 to the electronic device 100 and/or to support the feedback surface 400 above a substrate 1606. The biasing supports may be made of a compliant material that can change dynamically to adjust the haptic and acoustic output of the haptic device. For example, in one embodiment the biasing supports may be made of a piezoelectric material that changes shape based on an input signal 1608. The haptic and acoustic output can vary based on the different shapes of the piezoelectric material assumed by the biasing supports in response to different input signals. The input signals can be transmitted by a processing device, such as the processing device 302 in FIG. 3. Other embodiments can utilize a different type of material that can change dynamically. For example, a compliant material that changes density or compliance can be used to adjust the haptic and acoustic output of a haptic device.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An electronic device comprising:
   a feedback surface defining a plane;
   an actuator;
   a connection member operably connecting the feedback surface to the actuator, wherein the actuator is configured to impart a force to the connection member and the feedback surface, thereby producing a haptic output and an acoustic output; and
   an output adjustment mechanism for changing the acoustic output relative to the haptic output for a given force.

2. The electronic device as in claim 1, wherein the output adjustment mechanism is configured to change an amount of out-of-plane movement of the feedback surface for the given force.

3. The electronic device as in claim 1, wherein the actuator is positioned at an angle relative to the feedback surface.

4. The electronic device as in claim 1, wherein the connection member is positioned at an angle relative to the feedback surface.

5. The electronic device as in claim 1, further comprising a processing device operably connected to a memory and the actuator.

6. The electronic device as in claim 5, wherein the output adjustment mechanism comprises a biasing support operatively coupled to the feedback surface and configured such that a physical characteristic of the biasing support changes in response to a signal from the processing device, thereby changing the acoustic output relative to the haptic output.

7. The electronic device as in claim 1, wherein the output adjustment mechanism is configured to move the actuator from a first position to a second position to change an amount of the acoustic output relative to the haptic output for the given force.

8. A haptic device for an electronic device comprising:
   a feedback surface;
   an actuator; and
   a connection member operably connecting the feedback surface to the actuator, wherein
   the actuator is configured to impart a force to the feedback surface via the connection member, thereby producing a haptic and acoustic output; and
   the actuator is movable relative to the feedback surface in order to adjust the haptic and acoustic output.

9. The haptic device as in claim 8, wherein the actuator is in communication with a processing device.

10. The electronic device as in claim 8, wherein:
    the feedback surface defines a plane; and
    the actuator is movable in a direction substantially perpendicular to the plane.

11. The electronic device as in claim 8, wherein:
    when the actuator is in a first position, the actuator produces movement of the feedback surface having a first haptic component and a first acoustic component; and
    when the actuator is in a second position different from the first position, the actuator produces movement of the feedback surface having a second haptic component and a second acoustic component different from the first acoustic component.

12. The electronic device as in claim 11, wherein:
    the first acoustic component corresponds to a sound having a first volume; and
    the second acoustic component corresponds to a sound having a second volume greater than the first volume.

13. A method for adjusting a haptic and acoustic output of a haptic device, comprising:
    applying a force to a feedback surface to produce a first output having a first haptic component and a first acoustic component;
    changing a physical characteristic of the haptic device; and
    applying the force to the feedback surface to produce a second output having a second haptic component and a second acoustic component different than the first acoustic component.

14. The method as in claim 13, wherein changing the physical characteristic of the haptic device comprises moving the actuator relative to the feedback surfaces.

15. The method as in claim 13, wherein changing the physical characteristic of the haptic device comprises changing a physical characteristic of a support member operatively coupled to the feedback surface.

16. The method as in claim 15, wherein changing the physical characteristic of the support member comprises changing a shape of the support member.

17. The method as in claim 15, wherein changing the physical characteristic of the support member comprises changing a density of the support member.

18. The method as in claim 15, wherein:
    the support member comprises a piezoelectric material; and
    the method further comprises sending a signal from a processor to the support member, thereby changing the physical characteristic of the support member.

19. The method as in claim 13, wherein:
    the first acoustic component corresponds to a sound having a first volume; and
    the second acoustic component corresponds to a sound having a second volume greater than the first volume.

20. A method for adjusting a haptic and acoustic output of a haptic device, the haptic device comprising a feedback surface, an actuator, and a connection member operably connecting the feedback surface to the actuator, the method comprising:
- while the actuator is in a position relative to the feedback surface, actuating the actuator to apply a force to the feedback surface via the connection member, thereby producing a first haptic and acoustic output;
- translating the actuator to a different position relative to the feedback surface; and
- actuating the actuator to apply the force to the feedback surface via the connection member, thereby producing a second haptic and acoustic output different from the first haptic and acoustic output.

21. A haptic device comprising:
- a feedback surface;
- an actuator configured to produce a force to move the feedback surface;
- a biasing support operatively coupled to the feedback surface and configured such that a physical characteristic of the biasing support can be changed dynamically to adjust a haptic and acoustic output of the haptic device; and
- a processing device configured to send a signal causing the physical characteristic of the biasing support to change.

22. The haptic device of claim 21, wherein the biasing support comprises a piezoelectric material.

23. The haptic device of claim 21, wherein the physical characteristic of the biasing support that changes in response to the signal from the processing device is selected from the group consisting of: a shape, a density, and a compliance.

24. The haptic device of claim 21, wherein:
- when the biasing support exhibits a first physical characteristic, the haptic and acoustic output comprises a first haptic component and a first acoustic component; and
- when the biasing support exhibits a second physical characteristic different from the first physical characteristic, the haptic and acoustic output comprises a second haptic component and a second acoustic component different from the first acoustic component.

* * * * *